UNITED STATES PATENT OFFICE 2,097,227

DRY COCOA ALGINATE AND PROCESS OF MAKING SAME

Howard J. Lucas, Pasadena, Calif., assignor to Kelco Company, Los Angeles, Calif., a corporation of Delaware No Drawing. Application June 22, 1933, Serial No. 677,170. Renewed June 3, 1937

6 Claims. (Cl. 99—23)

This invention relates to so-called chocolate-milk beverages; and its principal object is to provide a dry compound or mixture of a soluble salt of alginic acid and cocoa, which compound can be shipped in dry condition but will readily disperse in water, and is especially designed for use in preparing chocolate-milk, or like beverage; and the invention includes the said compound and the process of making same.

Sodium alginate has heretofore been used in the manufacture of chocolate-milk as a protective colloid and to keep the cocoa fibers in suspension and prevent them from settling. It has been customary to first prepare a syrup containing cocoa, sugar and sodium alginate by adding to hot water the desired amount of cocoa, sugar and sodium alginate, and to then add such syrup to milk to produce a chocolate milk.

Although in general the use of a chocolate syrup is convenient, this is not always true if it has to be transported for any considerable distance; and a dry product possessing all the properties of the syrup which are desirable in the manufacture of a chocolate milk is preferable because it will remain in good condition indefinitely, is less bulky, and can be more easily packed and transported.

The chocolate syrups, as usually prepared, contain approximately forty-five per cent water, whereas my dry product contains approximately fifteen per cent water or even less. Also the syrup is liable to spoilage by the action of moulds or of fungi, whereas my dry product is much more resistant to such micro-organisms. Also the breakdown of alginic acid or its salts which proceeds slowly in the presence of water and which involves a gradual decrease in the valuable protective action of this agent, proceeds at a more rapid rate in the syrup, than in the dry product. Because of these reasons, my dry product is much superior to syrup possessing the properties desired.

The desired properties of my product are ready dispersibility in water and the ability to form a stable non-settling chocolate milk when added to milk, either directly or preferably after having first been dissolved in hot water. It is known that certain alginates, once they are dried, cannot easily be dispersed again in water. Apparently, during the process of drying, the sodium alginate is so completely adsorbed by the cocoa fibers that the latter are entirely surrounded by a film of alginate which prevents the cocoa particles from adhering to each other and from settling when added to water or milk.

In the case of sodium alginate dried on cocoa fibers the removal of water results in the sodium alginate combining with the cocoa in such a way that it is not removed from the cocoa when water or milk is added and does not disperse into the liquid. Therefore, it remains upon the fibers of the cocoa and is thus enabled to exert, to a maximum extent, its action as a protective colloid.

A very satisfactory dry cocoa-alginate-sugar-product in accordance with my invention can be produced as follows:

200 pounds of wet, refined alginic acid, 250 pounds of water and 5.11 pounds of soda ash (58% $Na_2O$) are thoroughly mixed until the resulting pasty mass has a uniform composition; then 10.6 pounds of refined sugar and 250 pounds of cocoa are added to the mass and the whole again mixed until uniformity is attained. The order of mixing the ingredients is not of great importance, for instance, the sugar and cocoa may be mixed together before adding the sodium alginate.

The proportion of sugar may vary greatly, but if a very large proportion of sugar is used the final product does not dry as well. When the proportion of sugar used is high it should not be added until the sodium alginate is thoroughly mixed. The amount of cocoa may also vary, but not within as wide limits as the sugar. The amount of water may also vary.

The resulting mass is then formed into suitable shapes and dried, until the moisture content is reduced to approximately fifteen per cent or lower. The dried product may then be ground or pulverized if desired. When it is to be used it can be dispersed in water and added to milk to produce chocolate milk, or it may be used in other beverages.

Instead of preparing the dry mixture from alginic acid, sodium carbonate and cocoa, a previously prepared sodium alginate, either in dry or paste form can be dispersed in water and the cocoa and sugar added thereto and the mixture dried.

Incorporation of cocoa with a paste of sodium alginate gives a product which when dried is more readily dispersed on the addition of water than cocoa alone or dried sodium alginate alone. The addition of sucrose (cane-sugar, beet-sugar) to the sodium alginate paste before drying increases the ease with which the dried product is dispersed in water. This results from the fact that the sugar itself is readily soluble in water and as it dissolves away from the mixture, the solvent molecules come into intimate contact with the alginate molecules. However, there is a limit to the amount of sugar which may be added if the mixture is to be dried without artificial heat. If too much sugar is present, drying at the ordinary temperature gives a sticky, gummy mass which cannot be ground and on that account is difficult to handle.

Instead of sodium alginate, ammonium alginate or other suitable salt of alginic acid might be used and instead of sucrose other suitable sugar, for example, dextrose, levulose, or maltose may be used. Malt also may be used.

The product is a dried sodium alginate-cocoa mixture, or a dried sodium alginate-cocoa sucrose mixture, or a similar mixture. The sodium alginate may be replaced, in whole or in part, by another soluble edible salt of alginic acid; or the sucrose may be replaced, in whole or in part, by other soluble sugar or both the sodium alginate and sucrose may be so replaced.

Chocolate milk made with my novel dry product excels in stability and non-settling property chocolate milk made in the usual manner. By mixing cocoa with sodium alginate paste and then drying same, the effectiveness of the alginate in preventing the cocoa from settling out of the chocolate milk is actually increased. This is one of the important features of my new product and makes it more valuable for use in chocolate milk manufacture than alginate dried without the cocoa.

Another valuable feature of my product is the increased stability of the alginate resulting from the incorporation thereof with cocoa while wet, and then drying the mixture; the adsorption of the alginate by the cocoa, a process closely related to the stabilizing effect of the alginate upon the cocoa, becomes more complete as the drying takes place. This results not only in a more efficient stabilizing action, as discussed above, but also in greater resistance of the alginate against breakdown.

I claim:—

1. The herein described process of producing a dry readily dispersible cocoa-alginate; consisting in mixing wetted alginic acid with soda ash to form a pasty mass, mixing cocoa with the mass, and drying the mixture.

2. The herein described process of producing a dry readily dispersible cocoa-alginate; consisting in preparing a pasty sodium alginate, mixing cocoa therewith, and drying the mixture.

3. The herein described process of producing a dry readily dispersible cocoa-alginate consisting in mixing wetted alginic acid with soda ash to form a pasty mass; mixing sugar and cocoa with the mass to form a uniform mixture; and drying the mixture.

4. A dry readily dispersible cocoa alginate comprising cocoa in admixture with a composition consisting of wetted alginic acid and soda ash mixed to form a pasty mass, said admixture being dried.

5. A dry readily dispersible cocoa alginate consisting of cocoa in admixture with a pasty sodium alginate, said admixture being dried.

6. A dry readily dispersible cocoa alginate consisting of cocoa and sugar in admixture with a composition of wetted alginic acid and soda ash mixed to form a pasty mass, said admixture being mixed to form a uniform mass and dried.

HOWARD J. LUCAS.